US006639171B2

(12) United States Patent
Tsuge

(10) Patent No.: US 6,639,171 B2
(45) Date of Patent: Oct. 28, 2003

(54) METHOD FOR JOINING COIL WIRE HAVING HEAT RESISTANT COATING TO COIL TERMINAL

(75) Inventor: Mitsunori Tsuge, Kariya (JP)

(73) Assignee: Anden Co., Ltd., Anjo (JP)

( * ) Notice: Subject to any disclaimer, the term of this patent is extended or adjusted under 35 U.S.C. 154(b) by 0 days.

(21) Appl. No.: 10/201,194

(22) Filed: Jul. 24, 2002

(65) Prior Publication Data

US 2003/0019916 A1 Jan. 30, 2003

(30) Foreign Application Priority Data

Jul. 30, 2001 (JP) .................................... 2001-229969

(51) Int. Cl.[7] .............................................. B23K 9/167
(52) U.S. Cl. .................... 219/56.22; 219/75; 219/91.21
(58) Field of Search ........................... 219/56.22, 56.21, 219/75, 91.21; 228/219

(56) References Cited

U.S. PATENT DOCUMENTS 4,558,200 A * 12/1985 Weigand, Jr. ............ 219/56.22
4,687,898 A * 8/1987 Riordan et al. .......... 219/56.22
6,198,064 B1 * 3/2001 Fujiwara .................. 219/56.21

FOREIGN PATENT DOCUMENTS

JP A-2000-190068 7/2000
JP A-2001-87854 4/2001

* cited by examiner

*Primary Examiner*—Clifford C. Shaw
(74) *Attorney, Agent, or Firm*—Posz & Bethards, PLC

(57) ABSTRACT

An end portion of a coil wire is wound around a coil terminal to form a wound portion. Then, air is supplied to the wound portion. While the air is supplied to the wound portion, heat is supplied in a first stage to the coil terminal, and thus a heat resistant coating of the coil wire is burnt and is removed from the coil wire located in the wound portion. Thereafter, heat is supplied in a second stage to the coil terminal, and thus a protrusion of the coil terminal is melted to join the coil wire and the coil terminal to each other at the wound portion.

13 Claims, 4 Drawing Sheets

METHOD FOR JOINING COIL WIRE HAVING HEAT RESISTANT COATING TO COIL TERMINAL

CROSS REFERENCE TO RELATED APPLICATION

This application is based on and incorporates herein by reference Japanese Patent Application No. 2001-229969 filed on Jul. 30, 2001.

BACKGROUND OF THE INVENTION

1. Field of the Invention

The present invention relates to a method for joining a coil wire, which has a heat resistant coating, to a coil terminal.

2. Description of Related Art

Various techniques, such as fusing or soldering, has been used for joining a coil wire and a coil terminal to each other. In the case of fusing, the wire and the terminal need to be directly clamped and energized by corresponding electrodes. Thus, a space for accommodating the electrodes is required.

In the case of soldering, soldering flux needs to be applied to the coil wire and the coil terminal before soldering them together. Furthermore, when eutectic solder is used to solder the coil wire and the coil terminal together, a lead content in the eutectic solder gives rise to environmental concerns due to its toxicity. Also, if the coil wire is a heat resistant wire having a heat resistant dielectric coating around it, the soldering cannot be performed directly on the heat resistant wire through the coating. Thus, the heat resistant coating needs to be removed from the coil wire by a mechanical or chemical process before the coil wire is soldered to the coil terminal.

Each of Japanese Unexamined Patent Publication No. 2000-190068 and Japanese Unexamined Patent Publication No. 2001-87854 discloses a method for joining such a heat resistant wire and a coil terminal to each other.

In the method disclosed in Japanese Unexamined Patent Publication No. 2000-190068, a joint portion between the coil wire and the terminal is first covered with a joining aid material, and arc welding is performed on it to join them together. However, this method additionally requires the joining aid material and a process of covering the joint portion between the coil wire and the terminal with the joining aid material.

In the method disclosed in Japanese Unexamined Patent Publication No. 2001-87854, high-purity oxygen is supplied to the joint portion, and the heat resistant coating of the coil wire is combusted or burnt. However, when the high-purity oxygen is used, it is difficult to control a burning rate of the heat resistant coating, so that the coil wire and the terminal can possibly be burnt together with the heat resistant coating. Furthermore, when the high-purity oxygen is used, it must be handled with care. Also, the use of the high-purity oxygen disadvantageously increases manufacturing costs.

SUMMARY OF THE INVENTION

The present invention addresses the above disadvantages. Thus, it is an objective of the present invention to provide a method for joining a coil wire, which has a heat resistant coating, and a coil terminal to each other in a simple and effective manner that allows effective removal of the heat resistant coating from a joint portion between the coil wire and the coil terminal.

To achieve the objective of the present invention, there is provided a method for joining an end portion of a coil wire, which has a heat resistant coating, and a coil terminal to each other. In the method, the end portion of the coil wire is wound around the coil terminal to form a wound portion. Then, air is supplied to the wound portion. Next, heat is supplied in a first stage to the coil terminal, and thus the heat resistant coating is removed from at least a portion of the coil wire located in the wound portion. Thereafter, heat is supplied in a second stage to the coil terminal, and thus a portion of the coil terminal is melted to join the coil wire and the coil terminal to each other at the wound portion.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the present invention will be described with reference to FIGS. 1 to 4.

Figure 1:
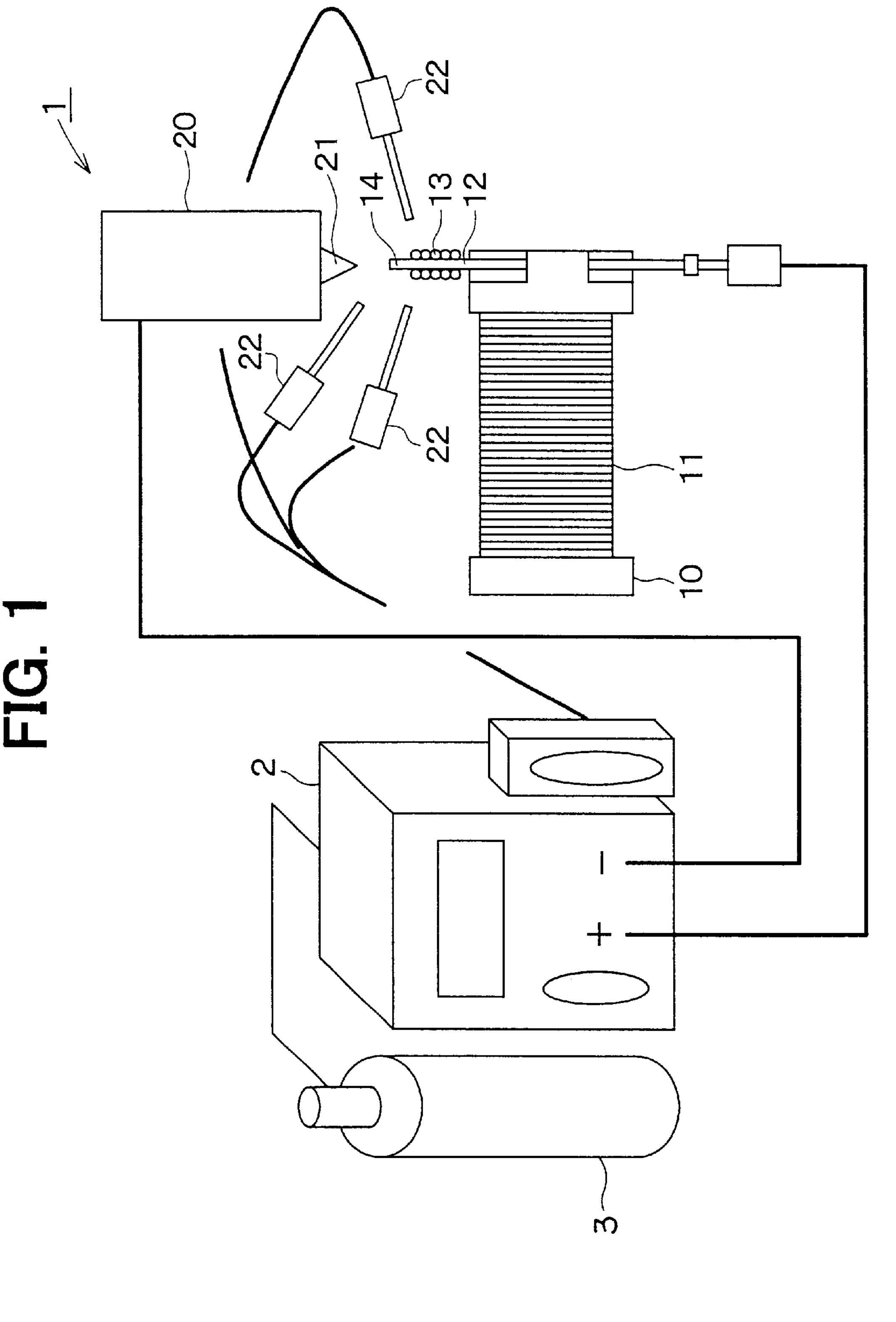
FIG. 1 is a schematic view showing an entire structure of an arc welder according to an embodiment of the present invention.

With reference to FIG. 1, an arc welder 1 of the present embodiment is used to join an end portion of a coil wire 11, which is wound around a coil bobbin 10, and a coil terminal 12 to each other. The coil wire 11 is a heat resistant wire, which is coated with a heat resistant coating and can be thus used under a high temperature environment. The heat resistant wire is formed by applying a heat resistant coating material (e.g., polyester or polyimide) over a copper wire and then baking the coating material. In the present embodiment, polyester, which has a thermal decomposition temperature of about 350 degrees Celsius, is used as the heat resistant coating material.

As shown in FIG. 1, the arc welder 1 of the present embodiment includes a torch 20 and air nozzles 22. The arc welder 1 performs tungsten inert gas (TIG) welding. In the TIG welding, an electric arc is generated between a tungsten electrode and a workpiece in an inert gas atmosphere when electric current is supplied. The arc causes generation of arc heat, which causes the welding.

The torch 20 includes a tungsten electrode 21 and an inert gas supply portion. The electrode 21 and the terminal 12 are opposed to each other and are spaced from each other to thereby define a relatively small space (in this embodiment, this is about 0.5–1.0 mm) therebetween. The torch 20 supplies argon gas, which is supplied from an argon gas source 3, through the inert gas supply portion and generates the arc between the electrode 21 and the terminal 12 when electric current is supplied to the torch 20 (or the electrode 21) from a power source 2. Thus, arc heat (welding heat) is generated and is supplied to the terminal 12 from a distal end of the electrode 21.

The air nozzles 22 are arranged to supply air to a joint portion between the wire 11 and the terminal 12 during the arc welding. The oxygen is supplied for the following reason. That is, in the TIG welding, the welding is performed in the inert gas atmosphere, so that the oxygen needs to be supplied to burn the heat resistant coating of the wire 11 at the joint portion. It is desirable to arrange the air nozzles 22 in such a manner that the air nozzles 22 supply the oxygen uniformly around the entire perimeter of the joint portion to effectively burn the heat resistant coating. Thus, it is desirable to arrange three or more air nozzles 22. In the present embodiment, three air nozzles 22 are arranged at substantially 120 degree intervals about the joint portion.

Figure 2:
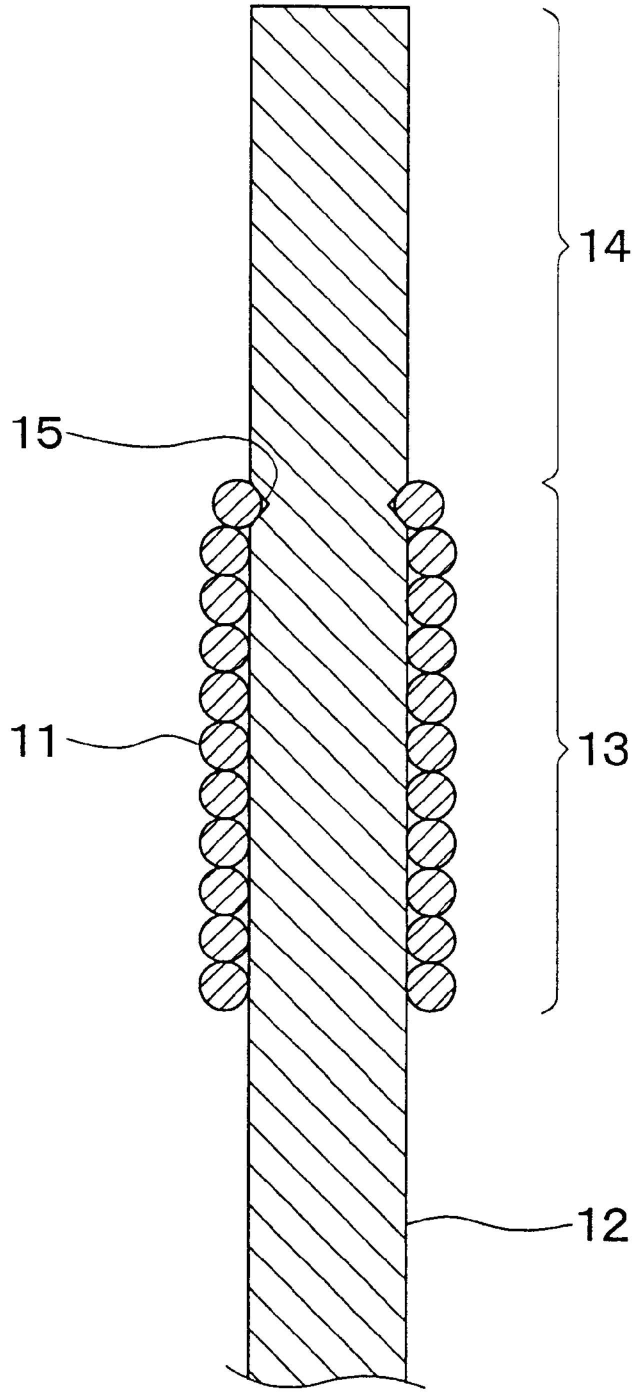
FIG. 2 is an enlarged cross-sectional view showing a joint portion between a coil wire and a coil terminal according to the embodiment.

With reference to FIG. 2, the end portion of the wire 11 is wound around the terminal 12 to form a wound portion 13. The wound portion 13 forms the joint portion, at which the end portion of the wire 11 and the terminal 12 are joined together.

The wound portion 13 is formed at a predetermined position, which is spaced away from a distal end of the terminal 12, as shown in FIG. 2. In this way, a protrusion 14 is formed in a distal end region of the terminal 12 and extends a predetermined length from the wound portion 13. The protrusion 14 forms a molten portion, which is melted by the arc heat. During the welding, the protrusion 14 is melted by the arc heat and forms the molten portion in a form of a spherical mass that accumulates the heat. The heat accumulated in the molten portion is conducted to the wound portion 13, so that the heat resistant coating of the wire 11 is burnt at the wound portion 13.

The molten portion needs to have a predetermined volume (predetermined protruding length) to accumulate the arc heat and provides the sufficient heat to the wound portion 13 to burn the heat resistant coating. When the volume of the molten portion is too small, the amount of heat becomes insufficient, so that the heat resistant coating of the wire 11 is incompletely burnt and becomes a carbon residue, which prevents the welding.

On the other hand, if the volume of the molten portion is excessively large, the molten portion becomes excessively heavy, so that the molten portion falls from the wound portion 13 before completion of the burning of the heat resistant coating. An appropriate volume of the molten portion for burning the heat resistant coating varies from product to product. In this embodiment, for illustrative purpose, a size of a cross section of the terminal 12 is chosen to be 0.5 mm×0.3 mm. In such a case, a size of the protrusion 14, which forms the molten portion, needs to be 0.1 $mm^3$ or more.

The terminal 12 has a notch (recess) 15 formed in an outer peripheral surface of the terminal 12. The notch 15 acts as a wound portion fixing means for fixing a position of the wound portion 13. The notch 15 is required to fix the position of the wound portion 13 relative to the distal end of the terminal 12. More specifically, the notch 15 is required to at least fix a portion of the wound portion 13, which is located close to the distal end of the terminal 12. Thus, the notch 15 is formed at least at the portion of the wound portion 13, which is located close to the distal end of the terminal 12, as shown in FIG. 2.

When the wire 11 is engaged with the notch 15, the position of the wound portion 13 is fixed. In this way, the position of the wound portion 13 relative to the distal end of the terminal 12 can be fixed, so that the length of the protrusion 14 can be kept substantially the same in each product.

Figure 3A:
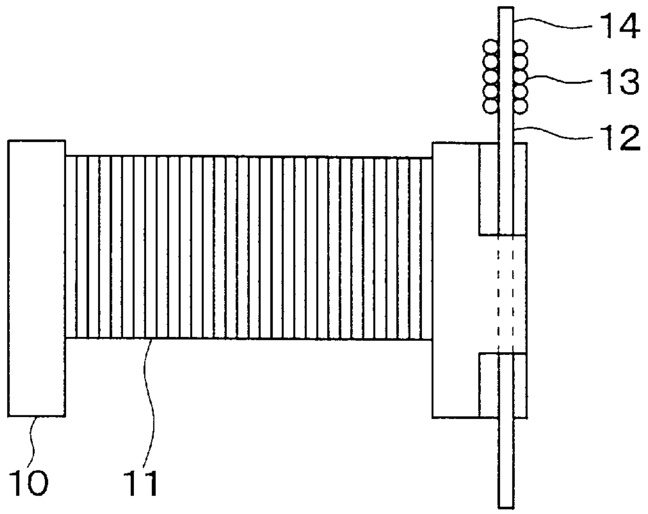
FIG. 3A is an illustrative view showing one step of a method for joining the coil wire and the coil terminal to each other.

Next, the method for joining the coil wire 11 and the terminal 12 together using the arc welder 1 will be described with reference to FIGS. 3A to 4. FIGS. 3A to 3C show series of steps of the method. FIG. 4 shows supply of electric current to the torch 20 with time.

In the step shown in FIG. 3A, the wound portion 13 is formed by winding the end portion of the wire 11 around a predetermined portion of the terminal 12.

Figure 3B:
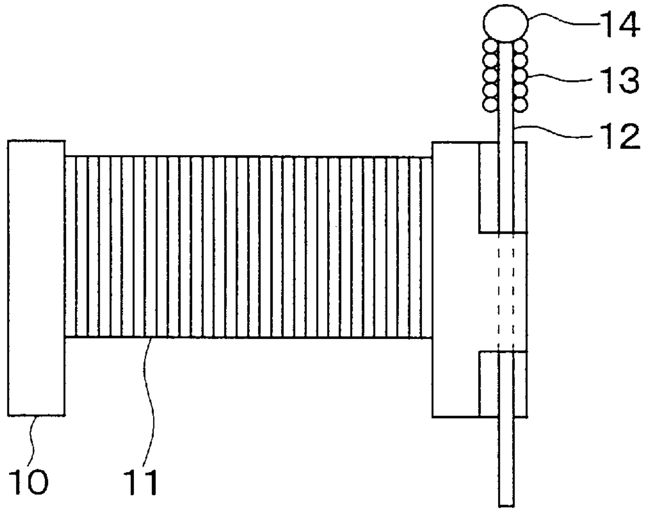
FIG. 3B is another illustrative view similar to FIG. 3A showing another step of the method.
Figure 4:
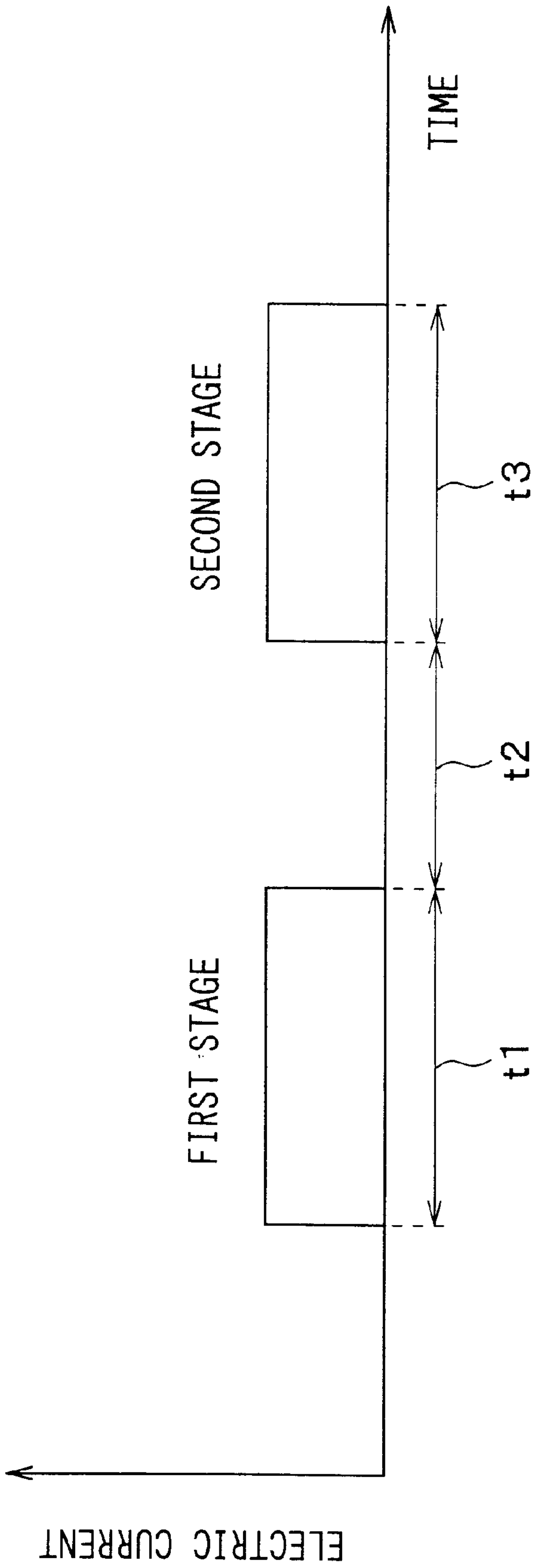
FIG. 4 is a diagram depicting a control waveform showing supply of electric current to a torch according to the embodiment.

In the next step shown in FIG. 3B, the heat resistant coating is burnt and is thus removed from the wire 1 at the wound portion 13 by a first arc (first heat supply).

First, as shown in FIG. 4, electric current (first stage electric current) is supplied to the torch 20 (or electrode 21) from the power source 2 in a first stage. The electric current is supplied for a predetermined time period (first predetermined time period) t1 in the first stage. At this stage, the air is supplied to the wound portion 13 through the air nozzles 22. During the supply of the electric current in the first stage, the heat resistant coating needs to be burnt and removed. As a result, a flow rate of the air is relatively high in the first stage. In the present embodiment, the air is supplied at a flow rate of about 1.5 liter per minute in the first stage.

When the electric current is supplied to the torch 20, the arc is generated between the electrode 21 and the terminal 12, and the arc heat is supplied to the terminal 12. The arc heat is conducted from the distal end of the terminal 12 in a downward direction in the drawings, so that the protrusion 14 is melted and becomes the spherical molten portion 14. The heat is accumulated in the molten portion 14.

The heat is conducted to the wound portion 13 from the molten portion 14, so that the wound portion 13 is heated to the thermal decomposition temperature (in this embodiment, this temperature is 350 degrees Celsius) of the heat resistant coating or higher. Since the air is supplied to the wound portion 13 through the air nozzles 22, the heat resistant coating is burnt. Thus, the heat resistant coating is removed from the wire 11 at the wound portion 13.

The amount of arc heat supplied to the terminal 12 is kept substantially constant. In the present embodiment, the length of the protrusion 14, which forms the molten portion, is fixed by forming the notch 15 in the terminal 12. In this way, when the heat is conducted from the molten portion 14 to the wound portion 13, the heat can be equally applied over the wound portion 13.

If the supply of the electric current is not terminated before exceeding the predetermined time period t1, the spherical molten portion 14 accumulates the excessive amount of heat and is thus exploded before the completion of burning of the heat resistant coating, so that the welding cannot be accomplished. On the other hand, in the present embodiment, when the supply of the electric current at the first stage is terminated at the end of the predetermined time period t1, the supply of the heat to the terminal 12 is temporarily terminated after the required amount of heat, which is required for burning and removing the heat resistant coating, is supplied to the molten portion 14. Thus, the heat resistant coating can be effectively burnt without causing the explosion of the molten portion 14. The burning of the heat resistant coating needs to be completed only before initiation of a second stage (described later).

It is not required to entirely burn and remove the heat resistant coating from the wound portion 13 of the wire 11 by the first arc. More specifically, it is only required to burn and remove the heat resistant coating from a required portion of the wound portion 13, which is required for the welding. That is, it is at least required to remove the heat resistant coating from the portion of the wound portion 13, which is located close to the distal end of the terminal 12.

Figure 3C:
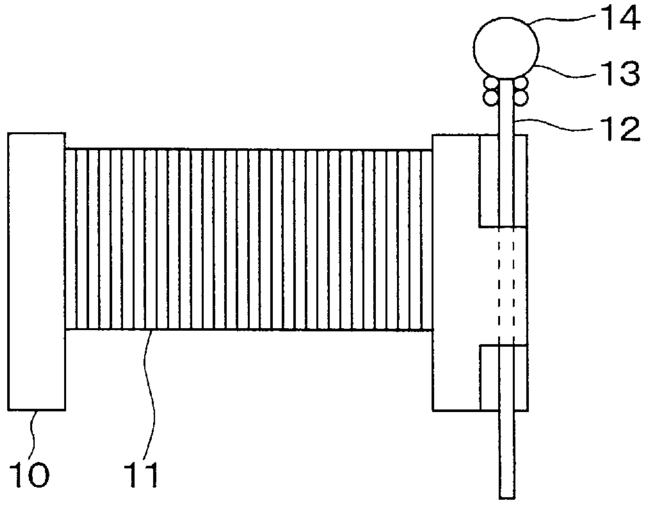
FIG. 3C is a further illustrative view similar to FIGS. 3A and 3B showing another step of the method.

In the next step shown in FIG. 3C, the portion of the wire 11, from which the heat resistant coating is removed by the first arc, is welded to the terminal 12 by a second arc (second heat supply).

First, as shown in FIG. 4, supply of the electric current (second stage electric current) to the torch 20 in the second stage is performed when a predetermined time period (predetermined time interval) t2 elapses from the end of the supply of electric current in the first stage. The electric current is supplied for a predetermined time period (second predetermined time period) t3 in the second stage. In the present embodiment, the time period t3 and the magnitude (or ampere) of electric current in the second stage are the same as the time period t1 and the magnitude of electric current in the first stage.

In the second stage, the air is supplied to the wound portion 13 through the air nozzles 22. The supply of the air is required to restrain carbonization of the heat resistant coating at a corresponding region of the wound portion 13 where the heat resistant coating has not been removed by the first arc and has been left there. Also, the supply of the air is required to burn and remove the remaining heat resistant coating from the wound portion 13. At this time, when the amount (or flow rate) of the supplied air is excessively large, blow holes are formed in the joint portion. Because of this, it is desirable to minimize the amount of the supplied air. In the present embodiment, the air is supplied in the second stage at a flow rate of about 0.6 liter per minute, which is smaller than that of the first stage.

When the electric current is supplied to the torch 20, an arc is formed between the electrode 21 and the terminal 12, and thus arc heat is generated and is conducted to the terminal 12. The molten portion 14, which already has the spherical shape, is re-melted. Thus, the wound portion 13, from which the heat resistant coating has been removed, is covered with the molten portion 14. As a result, the end portion of the wire 11 and the terminal 12 are welded or joined together.

As described above, when the heat, which is generated by the arc, and the air are supplied to the wound portion 13 in the above-described stepwise manner, the wire 11, which has the heat resistant coating, and the terminal 12 can be easily joined together in a simple manner. With this method, it is not required to remove the heat resistant coating from the wire 11 by the mechanical process or the like in advance of the welding, and the joining aid material used in the prior art is not required.

Furthermore, in the present embodiment, the air is supplied through the air nozzles 22 to burn the heat resistant coating. In this way, the heat resistant coating is not rapidly burnt, and thus the burning of the heat resistant coating can be easily controlled. Furthermore, the air is inexpensive and can be handled easily.

The above embodiment can be modified as follows.

In the above embodiment, the arc welding is used to supply the heat to the coil terminal 12. The invention is not limited to this. For example, in place of the arc welding, laser welding can be used to supply heat to the coil terminal 12.

Furthermore, in the above embodiment, the notch 15 is provided in the terminal 12 as the wound portion fixing means for fixing the position of the wound portion 13. The invention is not limited to this arrangement. For example, a stepped portion, by which the position of the wound portion 13 can be fixed, may be provided in the terminal 12 in place of the notch 15. Alternatively, a clinched portion for fixing the wound portion 13 can be formed by clinching a corresponding portion of the wire 11, which is wound around the terminal 12.

Also, in the above embodiment, the method is used for joining the coil. However, the method can be also used for joining an end portion of a wire of any appropriate electronic component, such as an electromagnetic relay, a motor, a solenoid or a sensor.

In the above embodiment, the time period t1 for applying the electric current and the magnitude of the applied electric current in the first stage are the same as the time period t3 for applying the electric current and the magnitude of applied electric current, respectively, in the second stage. However, these values can be modified depending, for example, on the amount of heat required for burning the heat resistant coating and the amount of heat required for welding the wire. For example, these values can be modified as follows.

That is, it is assumed that the amount of heat required for welding the wire in the second stage is greater than the amount of heat required for burning the heat resistant coating in the first stage. Furthermore, the re-melting of the molten part, which has been melted once before, generally requires the greater amount of heat. Thus, the time period for applying the electric current in the second stage can be lengthened in comparison to the time period for applying the electric current in the first stage, or the magnitude of electric current in the second stage can be increased in comparison to the magnitude of electric current in the first stage.

Furthermore, in the above embodiment, the electric current is supplied only twice to form the first arc and the second arc. This can be modified as follows. That is, instead of supplying the electric current only once to form the first arc, the first arc can be formed by supplying the electric current twice or more. Similarly, instead of supplying the electric current only once to form the second arc, the second arc can be formed by supplying the electric current twice or more.

Additional advantages and modifications will readily occur to those skilled in the art. The invention in its broader terms is therefore, not limited to the specific details, representative apparatus, and illustrative examples shown and described.

What is claimed is:

1. A method for joining an end portion of a coil wire, which has a heat resistant coating, and a coil terminal to each other, the method comprising:

winding the end portion of the coil wire around the coil terminal to form a wound portion;

supplying air to the wound portion;

supplying heat in a first stage to the coil terminal and thus removing the heat resistant coating from at least a portion of the coil wire located in the wound portion; and supplying heat in a second stage to the coil terminal and thus melting a portion of the coil terminal to join the coil wire and the coil terminal to each other at the wound portion.

2. A method according to claim 1, wherein:

the portion of the coil terminal includes a protrusion, which protrudes from the wound portion, wherein the protrusion has a predetermined volume;

the supplying of the heat in the first stage to the coil terminal includes supplying the heat to the protrusion of the coil terminal; and the supplying of the heat in the second stage to the coil terminal includes supplying the heat to the protrusion of the coil terminal.

3. A method according to claim 1, wherein the supplying of the air to the wound portion includes:

supplying the air to the wound portion in the first stage at a first predetermined flaw rate; and supplying the air to the wound portion in the second stage at a second predetermined flaw rate, wherein the first predetermined flaw rate is greater than the second predetermined flaw rate.

4. A method according to claim 1, wherein each of the heat supplied to the coil terminal in the first stage and the heat supplied to the coil terminal in the second stage is arc heat generated by arc welding.

5. A method according to claim 1, wherein the coil terminal includes a wound portion fixing means for fixing a position of the wound portion relative to the coil terminal.

6. A method according to claim 1, further comprising forming a recess in an outer peripheral surface of the coil terminal at a position spaced away from a distal end of the coil terminal before the winding of the end portion of the coil wire around the coil terminal, wherein the winding of the end portion of the coil wire around the coil terminal includes engaging a distal end of the wound portion to the recess.

7. A method according to claim 1, wherein the supplying of the air to the wound portion includes supplying the air to the wound portion through a plurality of air nozzles, which are arranged at substantially equal angular intervals about the wound portion.

8. A method according to claim 7, wherein the plurality of air nozzles includes three air nozzles, which are arranged at substantially 120 degree intervals about the wound portion.

9. A method according to claim 1, wherein:

the supplying of the heat in the first stage to the coil terminal includes supplying first stage electric current to an electrode for a first predetermined time period to form an arc between the electrode and the coil terminal in an inert gas atmosphere and thus to generate arc heat as the heat in the first stage; and the supplying of the heat in the second stage to the coil terminal includes supplying second stage electric current to the electrode for a second predetermined time period to form an arc between the electrode and the coil terminal in the inert gas atmosphere and thus to generate arc heat as the heat in the second stage.

10. A method according to claim 9, wherein:

a magnitude of the first stage electric current is substantially the same as a magnitude of the second stage electric current; and the first predetermined time period is substantially the same as the second predetermined time period.

11. A method according to claim 9, wherein a magnitude of the second stage electric current is greater than a magnitude of the first stage electric current.

12. A method according to claim 9, wherein the second predetermined time period is longer than the first predetermined time period.

13. A method according to claim 9, wherein the electrode is a tungsten electrode.

* * * * *